Feb. 13, 1951 H. S. WILLIAMS 2,541,952
COMBINATION BICYCLE, TRICYCLE, AND EXERCISER
Filed July 22, 1947 2 Sheets-Sheet 2
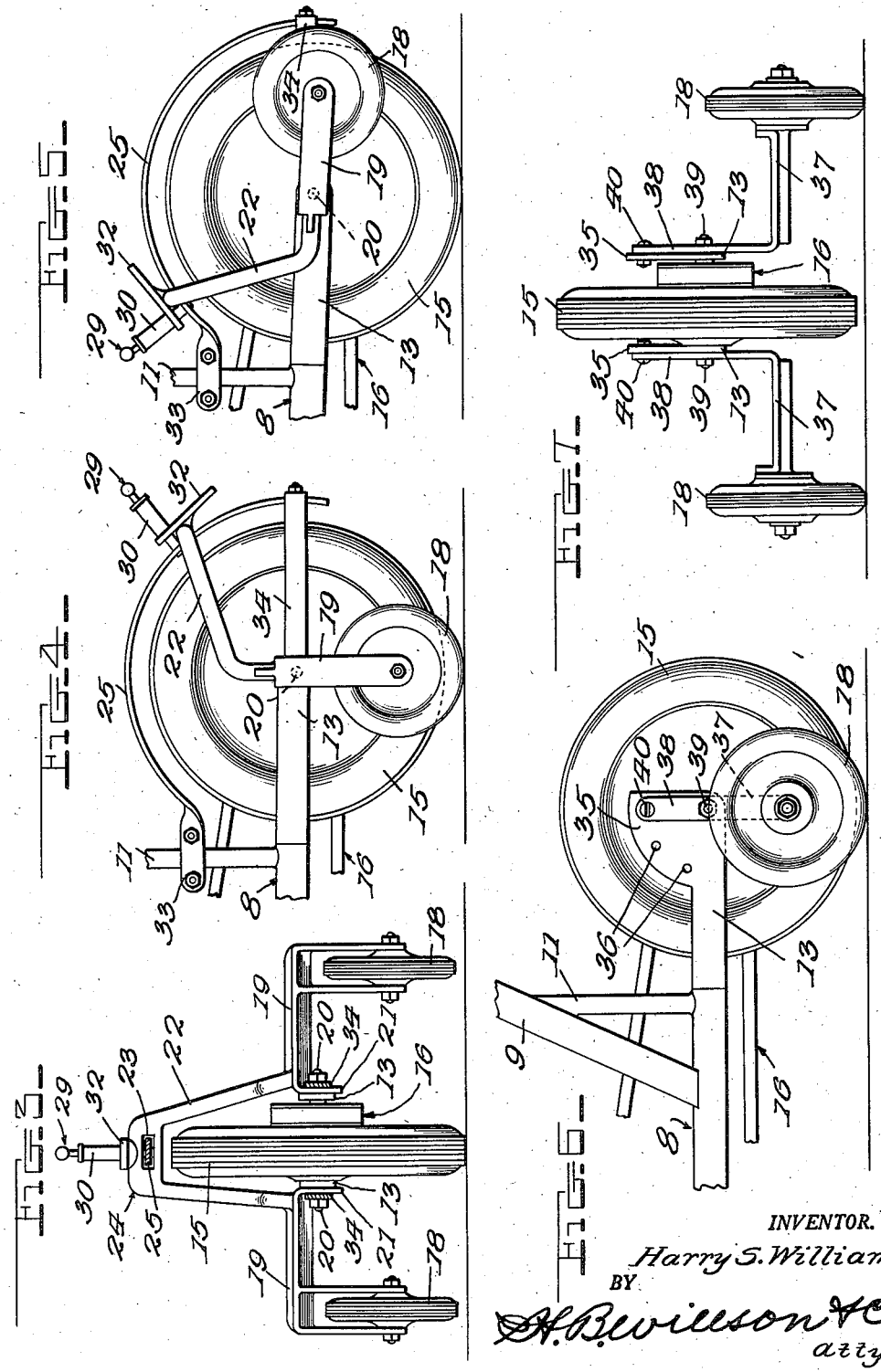
INVENTOR.
Harry S. Williams
BY
H. B. Wilson & Co.
atty.

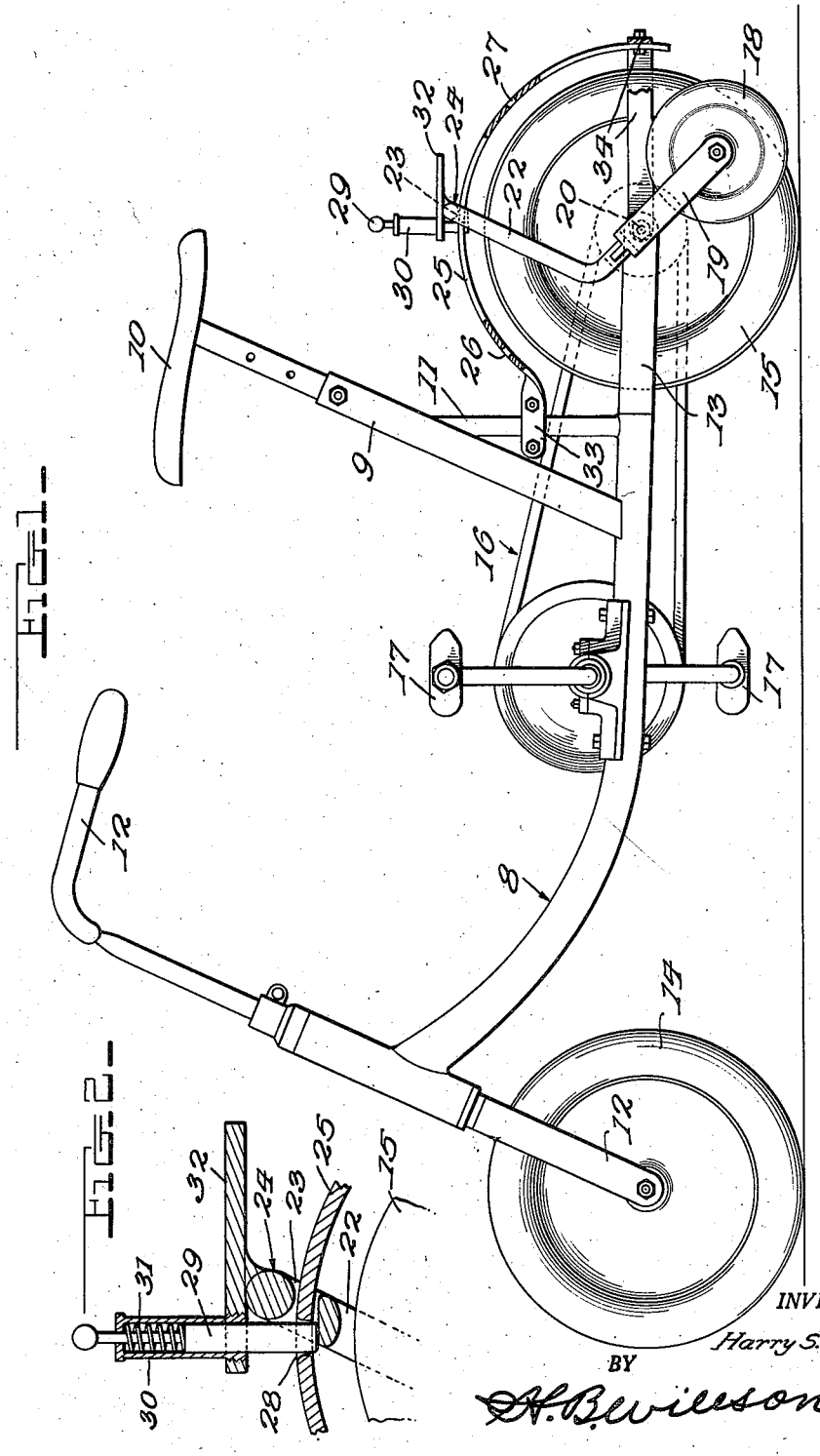

Patented Feb. 13, 1951

2,541,952

UNITED STATES PATENT OFFICE 2,541,952

COMBINATION BICYCLE, TRICYCLE, AND EXERCISER

Harry S. Williams, North Little Rock, Ark., assignor of one-third to James D. Averill and Ida J. Averill, and one-third to Ralph E. Zinn and Cleo Zinn, and one-third to C. H. Truog, all of Columbus, Kans.

Application July 22, 1947, Serial No. 762,571

1 Claim. (Cl. 280—303)

The invention relates to a novel pedal-actuated vehicle designed primarily for use by children, and although said vehicle is provided with four wheels, and therefore, may be termed a quadricycle, the construction is such that all four wheels are not simultaneously in use. On the contrary, a central front wheel, a central rear wheel and only one or the other of two auxiliary laterally spaced rear wheels, come into play when a child is learning to ride and balance; and thereafter only said central wheels are used, permitting riding as an ordinary bicycle. Also, the two auxiliary wheels are useable to support the central rear wheel above the ground, permitting a child to pedal for amusement or exercise without propelling the vehicle. The machine thus becomes virtually a combination tricycle, bicycle and stationary exerciser.

The foremost object of the invention has been to provide a novel construction which would enable a child to quickly, safely, and unconsciously learn to balance upon the central wheels while being protected against toppling laterally in either direction. The lower extremities of the auxiliary rear wheels are disposed at a plane about ¼" above the ground, and only one or the other of said auxiliary wheels, at a time, rolls on the ground, according to the direction in which the child may tilt the vehicle while becoming accustomed to it. In short order, however, I have found that the child learns to balance upon the two central wheels and unconsciously rides with both auxiliary wheels off the ground, thinking in the meantime that he is being held against toppling laterally. Careful tests with ten children, ranging in age from 2 to 6, have proven that this subconscious balancing occurs in about thirty minutes or less after starting to ride.

A further object of the invention has been to provide a novel construction which would permit quick and easy adjustment of the auxiliary rear wheels to positions in which they would sufficiently clear the ground to permit use of the vehicle as an ordinary bicycle, and to positions in which they would support the central rear wheel above the ground, allowing a child to pedal for pleasure or exercise without propelling the vehicle.

A still further object has been to provide a construction which could be expeditiously manufactured and profitably marketed at a reasonable price.

Figure 1 of the accompanying drawings is a side elevation, partly broken away and in section, the auxiliary wheels being set in position for teaching a child to balance and ride as if upon an ordinary bicycle.

Fig. 2 is an enlarged fragmentary longitudinal sectional view through the means for holding the auxiliary wheels in adjusted positions.

Fig. 3 is a rear elevation partly in section.

Fig. 4 is a fragmentary side elevation of the rear portion of the vehicle showing the auxiliary wheels set to support the central rear wheel off of the ground.

Fig. 5 is a view similar to Fig. 4 but illustrating the auxiliary wheels in positions in which they will not interfere with riding of the vehicle as an ordinary bicycle.

Fig. 6 is a fragmentary side elevation showing a somewhat modified construction.

Fig. 7 is a rear elevation of the construction shown in Fig. 6.

Preferences have been disclosed in the drawings and the illustrated construction will be rather specifically described, but attention is invited to the possibility of making variations within the scope of the invention as claimed.

A suitable frame 8 is provided, such as those commonly employed on children's side-walk bicycles, said frame including a rearwardly inclined seat post 9 upon which a seat 10 is adjustably mounted, said seat post having a suitable brace 11.

The frame 8 is provided with a front fork 12 having handle bars 12', and with a rear fork 13. A central front wheel 14 is mounted in the front fork 12, and a central rear wheel 15 is mounted in the rear fork 13, and I have shown a conventional belt-and-pulley driving mechanism 16 for said rear wheel, said mechanism being provided with operating pedals 17.

Two auxiliary rear wheels 18 are provided for the frame 8, said auxiliary wheels being laterally spaced in opposite directions from the central rear wheel 15. These auxiliary wheels are so mounted that they may occupy either of three positions. When they are slightly above the ground level as seen in Figs. 1 and 3, they prevent the frame from toppling laterally in either direction and aid the rider in learning to balance in such manner that he may soon ride without their aid. When the wheels 18 occupy the positions illustrated in Figs. 4 and 6, they support the rear central wheel 15 somewhat above the ground and the rider may, therefore, pedal the driving mechanism 16 for amusement or exercise, without propelling the vehicle. When the wheels 18 are in the extreme raised positions illustrated in Fig. 5, they will not perform any lateral bracing function for the frame and will, therefore, permit riding of the vehicle as an ordinary bicycle.

In Figs. 1 to 5, one construction is shown for mounting and adjusting the auxiliary wheels 18, while in Figs. 6 and 7 a different construction has been illustrated for the same purpose. The structure of Figs. 1 to 5 will first be described.

Two inverted L-shaped wheel-mounting brackets are pivotally connected with the rear fork 13 upon a pivotal axis extending transversely of said fork. To accomplish this pivotal mounting of the brackets, they may well be mounted upon the ends of the rear axle 20, and when this is done, the horizontal portions of the brackets will be provided at their inner ends with integral, right-angularly projecting and downwardly extending lugs or ears 21 apertured to receive said axle. The outer ends of the brackets form hangers in which the wheels 18 are mounted. The two brackets 19 are integrally connected by an arched member or yoke 22 which straddles the central rear wheel 15, said member 22 being formed with a slot 23 in its crown portion 24. The slot 23 slidably receives a rear fender 25 which is suitably mounted upon the vehicle frame, over the rear central wheel 15. This fender is formed with at least three openings or seats, two of which are seen at 26 and 27 in Fig. 1, whereas the third is shown at 28 in Fig. 2. A spring-pressed latch pin 29 is suitably mounted upon the arched member 22 and is cooperable with the openings 26, 27 and 28, to hold said member 22 and the brackets 19 in proper positions, according to the position which the auxiliary wheels 18 are to occupy. In the present disclosure, a fixed tube 30 serves as a mounting means and guide for the pin 29 and its spring 31, and I have shown said tube secured upon the front end of a plate 32 welded across the crown 24 of the arched member 22. The rearwardly projecting portion of the plate forms a fingerpiece to aid in adjusting the parts as required, while the pin 29 is held in released position.

In the present disclosure, the front end of the fender 25 is suitably clamped at 33 to the seat post brace 11, and the rear end of said fender is secured to the rear end of a U-shaped bracket 34 which projects rearwardly from the rear fork 13, being preferably mounted on the axle 20.

In Figs. 6 and 7, the rear fork 13 is provided with upstanding segments 35 having at least three spaced openings, two of which are seen at 36 in Fig. 6. The horizontally disposed mounting brackets 37 for the auxiliary wheels 18, are provided with integral, right angularly-projecting upstanding arms 38 lying against the outer sides of the segments 35, said arms being pivotally mounted at 39 upon the rear axle or otherwise. Bolts 40 serve to connect the upper extremities of the arms 38 with the segments 35, said bolts being receivable in any of the openings 36, according to the positions to be occupied by the auxiliary wheels 18. These wheels may of course be adjusted to the same positions as those illustrated in the first described form of construction.

It will be noted that in both forms the horizontal portions of the brackets 19, 37 have at their inner ends integral right angularly-projecting portions which are apertured to receive the projecting ends of the axle, so that the brackets may tilt thereon. Further, in both forms the radial distance between the peripheries of the wheels 15 and the axis of the axle 20, 39 is less than the radial distance between the periphery of the wheels 18 and the axis of the axle, so that when the brackets are adjusted to position the axis of the wheels 18 in a vertical plane passing through the axis of the axle, the wheel 15 will be supported above the ground as seen in Fig. 4.

From the foregoing, taken in connection with the accompanying drawings, it will be seen that novel and alvantageous provision has been made for carrying out the objects of the invention, and while preferences have been illustrated, attention is again invited to the possibility of making variations within the scope of the invention as claimed. When the auxiliary wheels are set as seen in Figs. 1 and 3 (approximately ¼" above the ground), they will prevent a child from toppling laterally in either direction when riding the vehicle, and they will thus give him confidence, and in short order, the child will balance himself upon the two central wheels 14 and 15, thinking in the meantime that he is being held against falling over by the auxiliary rear wheels. This subconscious balancing has been found to occur in about thirty minutes or less from the time a child starts to ride. After he has thus learned to balance and propel the vehicle, the wheels 18 may be raised to the positions shown in Fig. 5 and the child may ride as if upon an ordinary bicycle. When the wheels 18 are set as in Figs. 4, 6 and 7, they support the rear central wheel 15 above the ground and thus the vehicle is then useable effectively as a stationary exerciser.

What is claimed is:

In a combination bicycle and exerciser having a steerable front wheel, a pedal-driven rear wheel and a connecting frame including a horizontal rear fork between which the rear wheel is positioned and an upwardly and rearwardly inclined seat carrying post, a rear wheel axle mounted through openings in the rear of the fork and projecting laterally therefrom, an upright brace between the post and the rear of the frame, a horizontally disposed U-shaped bracket straddling the rear wheel and having its front portions mounted on the projecting portions of the axle, a curved fender over the upper portion of the rear wheel and having its front end secured to said brace and its rear end secured to and supported by the rear of said bracket, the curved portion of said fender being formed with longitudinally spaced openings, an adjustable, auxiliary-wheel-carrying member comprising a yoke straddling the fender and rear wheel and a pair of horizontal bracket arms projecting outwardly in opposite directions from the spaced ends of the yoke, said bracket arms having at their inner ends downwardly projecting ears mounted on the projecting ends of the axle and at their outer ends downwardly projecting hangers, auxiliary wheels journaled on said hangers, said yoke having its upper portion formed with an opening through which the fender passes and a slidable latch pin carried by said yoke and engageable with any of the openings in the fender to hold said auxiliary wheels in different positions of vertical adjustment with respect to said rear wheel.

HARRY S. WILLIAMS.

REFERENCES CITED

The following references are of record in the file of this patent:

UNITED STATES PATENTS

| Number | Name | Date |
|---|---|---|
| 359,126 | Brusie | Mar. 8, 1887 |
| 359,127 | Brusie | Mar. 8, 1887 |
| 611,451 | Hodgson | Sept. 27, 1898 |
| 1,177,290 | Tollstam | Mar. 28, 1916 |
| 2,391,982 | Kutil | Jan. 1, 1946 |

FOREIGN PATENTS

| Number | Country | Date |
|---|---|---|
| 2,432 | Great Britain | 1896 |
| 27,411 | Great Britain | 1896 |